United States Patent
Perentes et al.

(10) Patent No.: US 11,529,020 B2
(45) Date of Patent: Dec. 20, 2022

(54) BEVERAGE COOLING DEVICE FOR PREPARING COOLED BEVERAGE WHEN PAIRED WITH A BEVERAGE PREPARATION MACHINE

(71) Applicant: SOCIETE DES PRODUITS NESTLE S.A., Vevey (CH)

(72) Inventors: Alexandre Perentes, Sullens (CH); Alexandre Pugliese, Paudex (CH); Nicolas Ganshof van der Meersch, Vufflens-le-Chateau (CH)

(73) Assignee: Societe des Produits Nestle S.A., Vevey (CH)

( * ) Notice: Subject to any disclaimer, the term of this patent is extended or adjusted under 35 U.S.C. 154(b) by 685 days.

(21) Appl. No.: 16/488,407

(22) PCT Filed: Feb. 26, 2018

(86) PCT No.: PCT/EP2018/054612
§ 371 (c)(1),
(2) Date: Aug. 23, 2019

(87) PCT Pub. No.: WO2018/158170
PCT Pub. Date: Sep. 7, 2018

(65) Prior Publication Data
US 2020/0060476 A1 Feb. 27, 2020

(30) Foreign Application Priority Data
Feb. 28, 2017 (EP) .................................. 17158272

(51) Int. Cl.
*A47J 41/00* (2006.01)
*A47J 31/52* (2006.01)
*A47J 31/44* (2006.01)

(52) U.S. Cl.
CPC ....... *A47J 41/0044* (2013.01); *A47J 31/4492* (2013.01); *A47J 31/521* (2018.08);
(Continued)

(58) Field of Classification Search
CPC . A47J 41/0044; A47J 31/4492; A47J 31/5253
(Continued)

(56) References Cited

U.S. PATENT DOCUMENTS 6,141,969 A 11/2000 Launchbury et al.
8,759,721 B1 * 6/2014 Alexander ......... A47G 19/2288
165/61

(Continued)

FOREIGN PATENT DOCUMENTS

CN 1190567 A 8/1998
CN 201449097 U 5/2010
(Continued)

OTHER PUBLICATIONS

Andria et al., "A PWM Temperature Controller for Themoelectric Generator Characterization", Metrology for Aerospace, 2016, pp. 291-296.
(Continued)

*Primary Examiner* — Toan C Ly
(74) *Attorney, Agent, or Firm* — K&L Gates LLP

(57) ABSTRACT

Beverage cooling device (2) for rapidly cooling a beverage and serving the beverage when cooled, after having been dispensed from a beverage preparation machine (100) in the device, comprising a heat exchange container (3) comprising a closed chamber (4) containing a phase-change coolant capable of accumulating and restoring cooling energy and a beverage cavity (5) with an open upper end (6) for receiving the beverage; the closed chamber (4) and cavity (5) being separated by at least one heat conductive inner wall (8). The device is arranged to be handled separately from the bev-
(Continued)

erage preparation machine and comprises a control unit (13) comprising a communication module (14) arranged for communicating to the beverage preparation machine information representative of the presence of the device at proximity of the beverage preparation machine and/or of a cooling state of the coolant in the chamber. The invention also relates to a system comprising a beverage preparation device and the cooling device.

10 Claims, 14 Drawing Sheets

(52) U.S. Cl.
CPC ....... *A47J 31/5251* (2018.08); *A47J 31/5253* (2018.08); *A47J 2202/00* (2013.01)

(58) Field of Classification Search
USPC ........................................................ 62/457.3
See application file for complete search history.

(56) References Cited

U.S. PATENT DOCUMENTS

| | | |
|---|---|---|
| 9,139,351 B2 | 9/2015 | Chou et al. |
| 2005/0005612 A1 | 1/2005 | Kennedy |
| 2006/0156756 A1 | 7/2006 | Becke |
| 2010/0200110 A1 | 8/2010 | Segiet et al. |
| 2011/0056215 A1 | 3/2011 | Ham et al. |
| 2011/0204065 A1 | 8/2011 | Kolowich |
| 2011/0233219 A1* | 9/2011 | Proskey .................. A47J 41/00 220/592.17 |
| 2015/0143831 A1 | 5/2015 | Chou et al. |
| 2015/0366383 A1 | 12/2015 | Raunio et al. |
| 2016/0364814 A1 | 12/2016 | Yekutiely et al. |

FOREIGN PATENT DOCUMENTS

| | | |
|---|---|---|
| CN | 204032974 U | 12/2014 |
| CN | 104833427 A | 8/2015 |
| CN | 204908896 U | 12/2015 |
| CN | 105338865 A | 2/2016 |
| CN | 205053625 U | 3/2016 |
| CN | 205748696 U | 11/2016 |
| CN | 205750880 U | 11/2016 |
| DE | 102014205809 | 10/2015 |
| GB | 2447234 A | 9/2008 |
| JP | 2007064557 A | 3/2007 |
| WO | 2015173113 | 11/2015 |

OTHER PUBLICATIONS

Fei., "Electrical Cooling Cup Controlled by Single Chip Microcomputer", Electronics World, 2001, pp. 29-30.
China Patent Office Action Received for Application No. 2018800119619, dated Mar. 3, 2021, 19 Pages.

* cited by examiner

BEVERAGE COOLING DEVICE FOR PREPARING COOLED BEVERAGE WHEN PAIRED WITH A BEVERAGE PREPARATION MACHINE

CROSS REFERENCE TO RELATED APPLICATIONS

The present application is a National Stage of International Application No. PCT/EP2018/054612, filed on Feb. 26, 2018, which claims priority to European Patent Application No. 17158272.9, filed on Feb. 28, 2017, the entire contents of which are being incorporated herein by reference.

FIELD OF THE INVENTION

The invention relates to the field of the preparation of cool beverages using a beverage preparation machine such as a beverage capsule machine and the like.

BACKGROUND

The preparation of beverages using machines processing beverage ingredients in presence of water has become very popular. The beverage ingredients can be stored as powder, liquid or gel in a single-use capsule, multi-use container or other kinds of storage. Water is usually mixed with the beverage ingredients to brew, dissolve and/or dilute the ingredients. Most frequently, water is fed in hot or warm state with the ingredients such that a good interaction takes place between water and the ingredients.

For coffee, for example, water is usually heated in the machine by a heater at a high temperature usually close to the boiling point and immediately mixed with coffee powder (e.g. roast and ground) inside the capsule or a brewing chamber. Traditionally coffee is also served hot before it has had time to cool down. Coffee may also be mixed with other ingredients such as frothed or non-frothed milk to create coffee specialties such cappuccino or latte macchiato. Fresh milk may be frothed in a separate frothing device and the frothed milk can be combined to the coffee beverage. However, certain beverages are preferred when refrigerated such as iced cappuccino, iced latte macchiato, fresh milk, iced tea and the like. Generally, the beverage preparation machine is equipped or associated with a refrigerating circuit for cooling down the beverage before serving. Generally, this requires a heavy and bulky refrigeration unit, e.g., a cooling circuit with a compressor and an evaporator, which has the sufficient capacity to cool down the beverage rapidly.

WO2013087996 relates to a beverage machine for extracting a capsule comprising a cavity for receiving the capsule, a cavity feeding device with at least one pressurized fluid which comprises a heating device of the fluid feeding the cavity and at least one refrigeration device of the fluid positioned before or after the cavity for the capsule.

WO2015173113 relates to a cold beverage preparation device comprising an open reservoir, cooling means associated to the reservoir and additionally a rotational stirring member and a rotational scraping member in the reservoir. It also relates to a system comprising the cold beverage preparation device and a hot extraction module comprising a brewing unit and a hot beverage outlet connected to the brewing unit; the hot beverage outlet and the open cooling reservoir being arranged moveably relative to each other such that hot extracted beverage may be selectively dispensed from the hot beverage outlet into the open cooling reservoir in at least one relative position of the hot beverage outlet and the cooling module.

WO2015173100 also relates to a beverage preparation device for preparing hot and cold beverages comprising a hot extraction module with a brewing unit and a cooling module comprising a cooling reservoir, the brewing unit and the cooling module being arranged movably relative to each other.

The advantage of these prior art machine solutions integrating a refrigerating unit is that they provide hot and cold beverages conveniently and relatively quickly. However, the disadvantages essentially lie in that they are still relatively complicated, bulky, energy consuming and relatively costly to produce. Moreover, they do not provide sufficient modularity for adding or removing the cold beverage mode whenever it is needed.

SUMMARY OF THE INVENTION

The object of the present invention is to propose a machine solution for preparing cold beverages, in addition to hot beverages, which is simpler, less cumbersome, less energy consuming and which provides more flexibility and modularity as to the choice of hot and cold beverages.

For this, in a first aspect, the invention relates to a beverage cooling device for rapidly cooling a beverage and serving the beverage when cooled, after having been dispensed from a beverage preparation machine in the device, comprising a heat exchange container comprising a closed chamber containing a phase-change coolant capable of accumulating and restoring thermal energy and a beverage cavity with an open upper end for receiving the beverage; the closed chamber and cavity being separated by at least one heat conductive inner wall; the chamber being further closed by an outer wall; wherein the device is arranged to be handled separately from the beverage preparation machine. The device further comprises a control unit comprising a communication module arranged for communicating to the beverage preparation machine information representative of the presence of the device at proximity of the beverage preparation machine and/or representative of a temperature state of the coolant in the chamber.

The beverage cooling device can thereby be handled as an autonomous device to be moved away from the beverage preparation machine and its container to be placed in a freezer, e.g., a home freezer, for the coolant to accumulate cooling energy by phase change (e.g. change from liquid to ice). The beverage cooling device can then be handled to be associated with the beverage preparation machine for communicating with the beverage preparation machine. The communicated information can enable to pair the cooling device to the beverage preparation machine and possibly adapt the operations (e.g., parameters) of the beverage in the machine to prepare the beverage in anticipation of the subsequent cooling in the cooling device (e.g. setting a "cold beverage recipe" in the beverage preparation machine). The information may also trigger the automatic dispensing of the beverage in the cooling device.

In particular, a communication of presence and/or temperature state of the device can be established before enabling the transfer of beverage from the beverage preparation machine to the cooling device for proper and rapid cooling, e.g., to a chilled temperature. In particular, a cooling state can refer to a temperature-based or change-phase information of the coolant in the device. The temperature-based or phase-change information may be obtained by a thermoelectric module placed in the cooling device or by other means such as temperature sensor(s).

The communication module may be wireless or wired to the communication module of the beverage preparation device. The module can be arranged for communication to the beverage preparation device. Preferably, it is arranged for bidirectional communication. A wire module may be such as at least one selected from a group consisting of: RS-232, USB, I2C, wired local area network interface or another suitable wired module. Preferably, the communication module is a wireless communication module preferably using radio-waves. The module can pair with a compatible wireless communication module arranged in the beverage production machine. Most preferably, the communication module is a near field bi-directional communication module such as Wireless local area network (WLAN), a Bluetooth, WiFi, or a near-field-communication network interface. Most preferably, the communication module uses low-power radio Bluetooth.

In a preferred mode, the device comprises an electrical energy management system comprising a thermoelectric module arranged in thermal contact with the outer wall of the chamber for generating electric energy to the control unit, as a function of the temperature difference between a first heat conductive wall of the module in contact with the outer wall of the chamber and a second heat conductive wall of the module distant to the first wall; such electrical energy being at least partially used to power the communication module to generate communication signal(s).

The thermoelectric module can be a Peltier module with these two heat conductive walls. The module generates electrical current as soon as a temperature difference is applied between its conductive faces. The electrical current can also be used to power other electronic means such as a user interface on the device and/or a rechargeable battery.

In particular, the electrical energy management unit comprises a thermoelectric module associated with an electrical energy accumulator, such as at least one capacitor, ultra-capacitor and/or a rechargeable battery, arranged for storing electrical energy; such energy being selectively supplied to the control unit, in particular, to the communication module.

The electrical energy management unit may further comprise a power interrupter arranged with the electrical energy accumulator to selectively power the control unit, in particular, the communication module and preferably upon a mechanical, magnetic and/or electrical input of the beverage preparation machine on the power interrupter. In a preferred example, the interrupter can be a Reed-type switch magnetically closing, upon a magnetic input, e.g. from magnet(s), received from the beverage preparation machine, for establishing electrical supply from the energy accumulator to the control unit, in particular to the communication module. The advantage is a smart use of the available electrical energy (e.g., stored in the capacitor) by using it appropriately only when the cooling device is associated with the beverage preparation machine.

The device may further comprise a heat sink element which is connected to the second wall of the thermoelectric module. The heat sink element ensures a proper dissipation of the heat generated by the thermoelectric module at the second conductive wall to increase the efficiency of the module.

Additionally or alternatively, the device may comprise at least one temperature sensor arranged for sensing the temperature of surface of the container. The temperature sensor may be placed in contact with the outer wall or inner wall of the chamber to provide a close value of the temperature of the coolant in the chamber. The temperature sensor may be placed on the surface of the cavity to provide an indication of the temperature of contact with the beverage in the cavity.

Additionally or alternatively, the electrical energy management unit may comprise a battery for powering the communication module. The communication module may be powered selectively by a power interrupter as aforementioned. The battery can be a rechargeable battery powered by the thermoelectric module. The battery can be arranged to power different electronic means such as a user interface on the cooling device or a motor of whipping/frothing means.

The battery may be arranged for being charged by an external electrical source, e.g., via a DC electrical convertor and connector. In this case, a thermoelectric module can be omitted and replaced by the temperature sensor(s). The temperature sensor(s) provides a temperature input to the control unit and the control unit selectively powers the communication module to generate communication signal(s). The device may comprise a user interface arranged for displaying information. Depending on the type of information, information may be a selectable by the user for providing instructions to the control unit as to the operation of the cooling device and/or the beverage preparation machine. In particular, the information can be selectable recipes or temperature-related or device status-related information, identification data (e.g. user ID data such as names) or combinations thereof. In particular, the user interface can be arranged for displaying any one or combinations of: a) a temperature information related to the thermoelectric module or temperature sensor(s), b) a beverage volume, c) a selectable recipe or recipes of the beverage preparation device and/or cooling device, d) identification data.

The user interface can comprise visual indicators or displays or a plurality of displays. The temperature can be indicated in the form of a temperature numerical value (e.g., in Celsius) on a display or be a variable colour indicator such as leds (e.g., green-orange-red). The temperature can be given by the electric current provided by the thermoelectric module or provided by the input coming from temperature sensor(s).

The beverage volume can represent the volume of beverage present in the cavity of the container. For this, the device may comprise for instance a pressure sensor arranged at or under the bottom of the container. Alternatively, the device may comprise a thin film capacitive sensor for detecting the liquid filling level in the cavity of the container (thereby inferring the beverage volume in the device) such as described in co-pending European patent application No. 16158378.6. The thin film capacitive sensor may be attached to the inner wall of the container.

A selectable recipe or recipes can be represented by pictograms or name(s) on a display. The display can be associated to a selection means such as a button or be touch-sensitive display. The recipe can be selected by the user. The recipe may relate to a cold beverage and can set corresponding parameters of the beverage preparation device, such as water temperature, rotational speed(s) of a centrifugal brewing unit, water flow rate, water volume and combination thereof. The recipe may complementarily or alternatively relate to a cold beverage which is frothed in the cooling device by frothing means. The frothing means can also encompass simple mixing of the beverage. The recipe may appear as pictograms that differ depending on whether the recipe is related to parameter(s) of the beverage preparation device or to parameter(s) of the cooling device.

The cooling device may comprise a lid removably arranged for closing, preferably in a liquid-tightly manner, the open upper end of the container. The user interface may be positioned on the lid. For example, the user interface is constituted of at least several touch-sensitive displays showing information (e.g., temperature and/or beverage volume) or selectable recipes (iced cappuccino, latte macchiato, frothed milk, etc.).

The device may comprise a liquid frothing assembly connected to the lid. The frothing assembly may encompass mixing or agitation without or with low frothing effect on the beverage. The advantage is also to homogeneously and rapidly cool the beverage down in the device. The frothing assembly may be positioned in the lid or in the bottom of the container. When in the lid, it may comprise a motor, a rotary shaft and a frothing member at the free end of the rotary shaft, e.g., a whisk or impeller. When in the bottom of the heat exchange container, the frothing assembly can comprise a rotary frothing member, e.g., an impeller or whisk, comprising magnets removably positioned in the cavity and a magnetically driving means, for the rotary frothing member, positioned outside the container. The liquid frothing assembly may be powered by the thermoelectric module and/or a battery preferably a rechargeable battery. The battery may be placed in the lid when the frothing member is in the lid. The battery may power additional electronic means in particular the user interface that may also be part of the lid.

The device may comprise a heat insulation sheath to prevent direct hand contact with the heat exchange container. The insulation sheath is free of permanent connection means with the container to be preferably removably arranged with the container such that it can be removed before placing the container in a freezer to ensure a faster phase change (i.e., from liquid to ice) of the coolant in the chamber. The insulation sheath can have a bottom and a tubular sidewall both dimensioned to receive the container in a form-fitting manner. The insulation sheath can be essentially made of light polymer foam or rubber material such as silicone rubber or a combination thereof.

Preferably, the control unit is positioned in the bottom of the sheath or alternatively on the bottom of the sheath and between the sheath and the heat exchange container. The control unit can be connected to the internal surface of the bottom of the sheath or be embedded therein. When the container is removed, such as for being placed in a freezer or other below-zero cooling means for re-freezing, the control unit remains in the sheath thereby being prevented from cooling down to negative temperatures. The thermoelectric module is directly at ambient when the frozen container is re-placed in the sheath, thereby ensuring the production of electrical energy by the thermoelectric module without a tempering delay.

The bottom and/or lower part of the tubular sidewall can have venting through-holes for the dissipation of heat coming from the control unit, e.g., including the thermoelectric module. The venting holes can be positioned in correspondence to the heat sink element thereby ensuring a faster dissipation of the heat.

The heat conducting inner wall and the outer wall of the container are preferably formed as two separate pieces shaped as relatively tall recipients with the closed chamber in-between for storing the coolant. The pieces can be assembled by welding or soldering.

An annular seal ring, e.g. made of rubber or other sealing polymer, is arranged to liquid-tightly close the chamber at the upper annular edges of the inner and outer walls.

In order to promote heat exchange between the beverage and the phase-change coolant in the chamber, the beverage contact surface of the inner wall of the heat exchange container has a wave- or wrinkle-shape. Each wave or wrinkle extends essentially in the axial direction of the container. Each wave or wrinkle can be relatively large, e.g., 2-10 mm and may extend along substantially the whole height of the inner wall.

In order to more rapidly transfer the cooling energy produced by the melting of the coolant, the coolant contact surface of the inner wall preferably has a plurality of cooling fins. The cooling fins are immerged in the coolant and due to the heat conductivity of material of the fins which is much higher than the heat conductivity of the frozen coolant, the transfer of heat from the coolant to the beverage is speeded up. The number of fins may vary from 10 to 50 at the exterior face. The fins may extend axially along the sidewall and optionally may further extend at the bottom wall of the inner wall.

The inner wall of the container is preferably made of metal having a heat conductivity of at least 30 $W \cdot m^{-1} \cdot K^{-1}$, preferably above 50 $W \cdot m^{-1} \cdot K^{-1}$. Most preferably, the inner wall is made of stainless steel or aluminium alloy. The outer wall of the container is also preferably made of a heat conductive material, preferably metal having a heat conductivity of at least 30 $W \cdot m^{-1} \cdot K^{-1}$, preferably above 50 $W \cdot m^{-1} \cdot K^{-1}$. Most preferably, the inner wall is made of stainless steel or aluminium alloy.

The phase-change coolant is preferably a liquid coolant that freezes at temperature values below zero degree Celcius. A preferred coolant is salted water. The addition of salt enables to increase the cooling speed of the coolant while not compromising too much on the reduction of cooling energy. The percentage of salt in water can vary from 5% to 20% in weight.

The volume of coolant is preferably at least equal to or higher than the beverage storage capacity of the device. More preferably, the volume of the coolant to the beverage storage capacity is between 1.1:1 and 1.6:1. For example, for a beverage storage capacity in the cavity of 230 ml, the volume of coolant is preferably comprised between 150 ml and 350 ml. More preferably, the volume of coolant is between 250 and 300 ml.

The cooling device may also be utilized as a device for maintaining a liquid hot or for heating it in the cavity. The heat exchange container may be stored in a oven for being re-heated to allow the temperature of the coolant in the chamber to rise sufficiently above ambient, e.g., 60-95° C. The thermoelectric module can be functionally arranged for receiving heat energy (instead of cooling energy) from the heat exchange container and for producing electrical energy as a result of such heat transfer. For this, the thermoelectric module does not necessarily need to the physically reversed but the control unit is simply arranged for reversing polarity of the thermoelectric module. The electrical energy generated by the thermoelectric module is supplied to the communication module of the cooling device becoming a "warming device". The device is thereby arranged for indicating a temperature state to the beverage preparation machine when associated thereto and for enabling the selection of beverage recipe(s) corresponding to the communicated status.

The cooling device may comprise a control and energy management unit comprising the control unit and the electrical energy management unit, which is positioned in the bottom of the heat insulation sheath or alternatively on the bottom of the sheath and between the sheath and the container. In a preferred mode, the device comprises a lower control sub-assembly and an upper cooling subassembly which are removably connected to each other; the lower control sub-assembly comprising the control and energy management unit and a lower part of the heat insulation sheath and the upper cooling subassembly comprising the heat exchange container and an upper part of the heat insulation sheath.

The invention also relates to a beverage preparation system comprising the beverage cooling device of the invention and a beverage preparation machine. The cooling device and the beverage preparation machine can be paired by a communication network, preferably a wireless communication network such as Bluetooth. The established communication enables to provide information from the cooling device to the beverage preparation device as to the presence and/or the cooling capacity or temperature state of the cooling device. The information enables to configure the beverage preparation machine in a way that is adapted for dispensing the prepared beverage in the cooling device. In a preferred example, the information enables to configure the beverage preparation machine to set parameters of preparation of the beverage which are the most adapted to prepare a beverage to be cooled in the cooling device (e.g., cold beverage preparation recipe). For example, the temperature of water mixing with the beverage ingredients in the machine and/or the volume of the water can be adjusted as a response to information communicated by the beverage cooling device.

The communication network of the system is also preferably arranged for pairing more than one cooling device to a beverage preparation machine.

The wireless communication network can also be bi-directional thereby enabling to also transfer information from the beverage preparation machine to the cooling device such as recipe-related information and optionally information displayed such as information on the cooling device.

The wireless communication network may also be arranged for pairing other electronic devices in particular portable computers, tablets or smartphones.

The beverage preparation machine may further be arranged to communicate with a remote data server, such as the "Cloud", via a second communication interface, for enabling transfer of information related to the preparation of the beverage in the machine and/or cooling device. The information can be software and/or data related to recipes, identification, security, maintenance, product ordering and so on. The second communication interface can be WiFi or Ethernet or other interface means.

The beverage preparation machine may comprise:
- a beverage preparation unit arranged for receiving a beverage capsule or pod containing beverage ingredients,
- a water feed unit for supplying heated water in the beverage capsule for mixing with the beverage ingredients contained therein,
- a beverage outlet arranged in liquid communication with the beverage preparation unit for dispensing the beverage in the cooling device,
- a control unit for controlling the water feed unit, and optionally the beverage preparation unit, comprising a communication module arranged for communicating with the communication module of the control unit of the beverage cooling device and wherein the control unit is arranged for adjusting at least one preparation parameter of the water feed unit or beverage preparation unit as a result of the signal(s) received by or exchanged with the communication module of the beverage cooling device.

More particularly, the control unit is arranged for adjusting the water temperature and/or water volume of the water feed means as a result of the signal(s) received as to the temperature status of the cooling device. In a mode, the control unit is arranged for adjusting the water temperature of the water feed means to a water temperature lower than the temperature set for preparing a hot beverage when the signal(s) received from the cooling device is representative of a temperature state of the cooling device. For example, the water temperature of the water feed means can be set at 40+/−5° C. The machine is thereby configured to prepare a beverage by mixing beverage ingredients, e.g., brewing roast and ground coffee with water, at temperature which is compatible with a cooling of the beverage to a chilled temperature of beverage in a reasonable amount of time e.g., 4-8° C., e.g., 80 seconds of less.

BRIEF DESCRIPTION OF THE DRAWINGS

Features, advantages and objects of the present invention will become apparent for a skilled person reading the following detailed description of embodiments of the present invention, when taken in conjunction with the figures of the enclosed drawings.

DETAILED DESCRIPTION OF THE INVENTION

Figure 1:
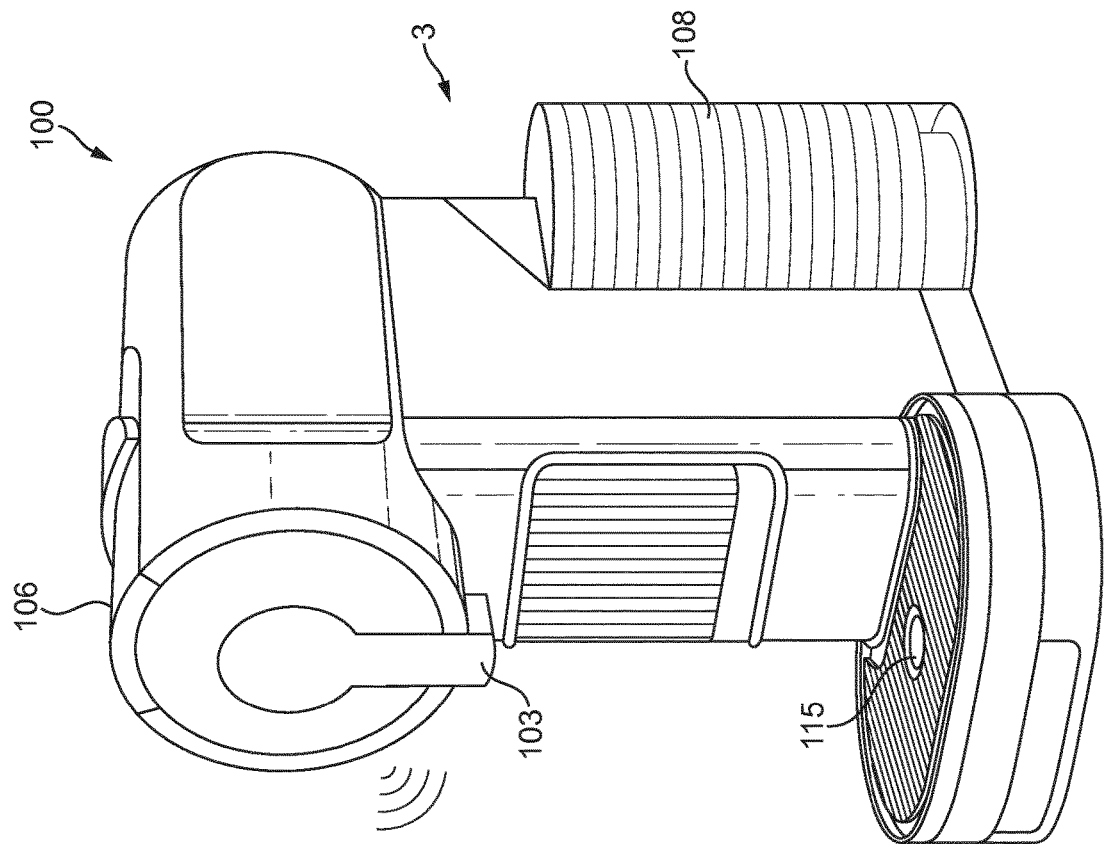
FIG. 1 shows to a beverage preparation system according to a first mode of the invention.
Figure 1:
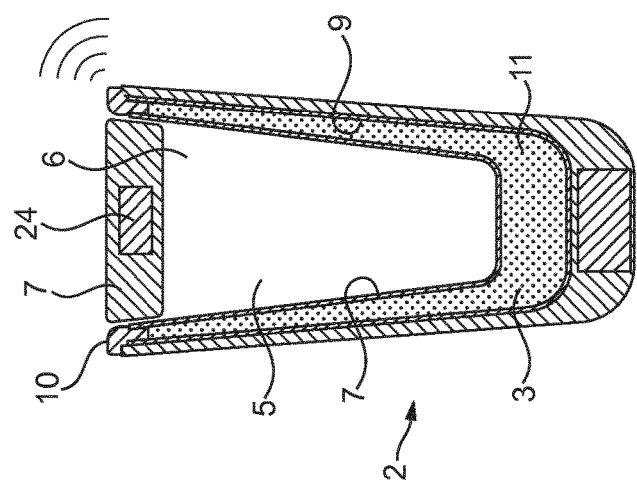
Figure 2:
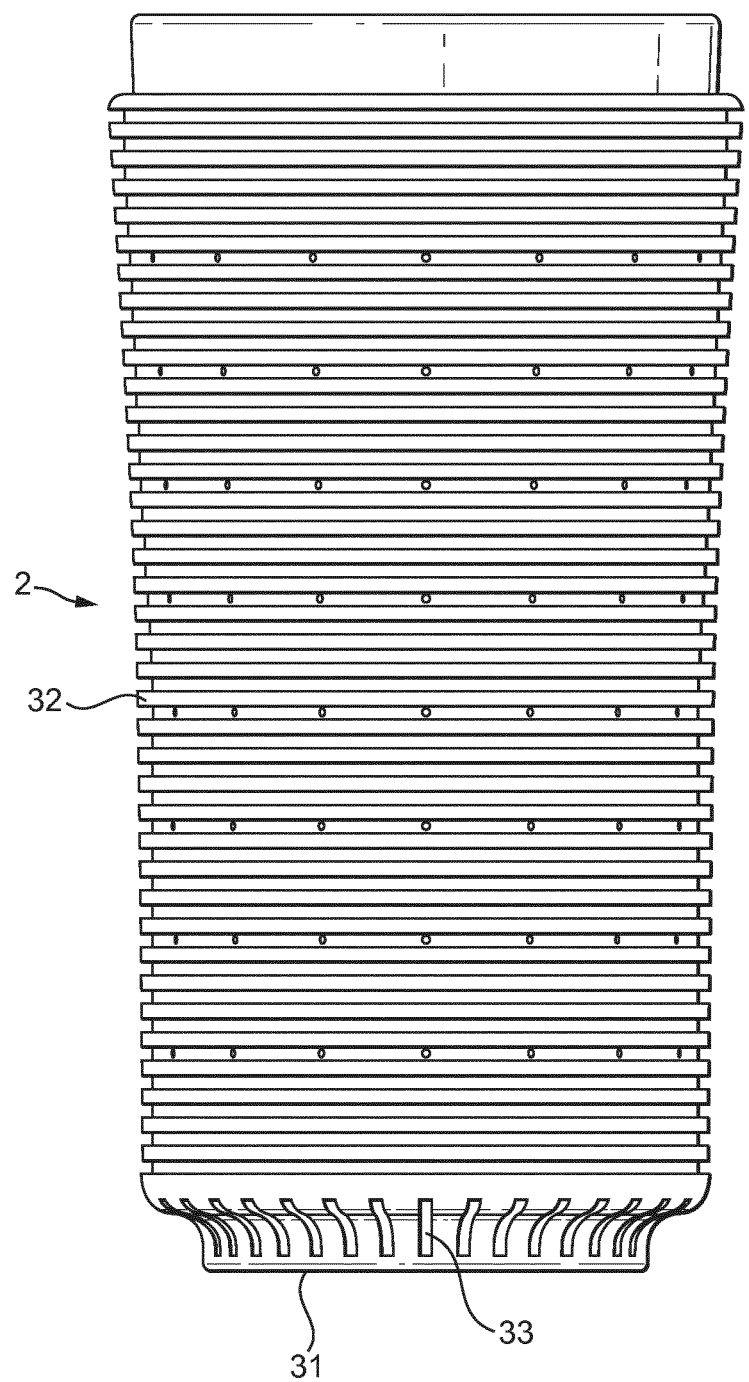
FIG. 2 shows a side view of a beverage cooling device according to the invention.

FIG. 1 is a schematic illustration of one embodiment of the system 1 of the invention comprising a beverage preparation machine 100 and a beverage cooling device 2. The beverage cooling device 2 is arranged as a stand-alone device that can be handled by the user. The beverage preparation machine 100 can be a tabletop beverage preparation machine using capsules or pods containing beverage ingredients. The beverage cooling device 2 and the beverage preparation machine 100 can be paired via a communication network. Preferably, the network uses near radio field such as Bluetooth thereby enabling to establish a direct connection for information transfer when the cooling device is positioned next to the machine. Alternatively other kinds of network could be established such as by a wired connection, for example, USB cabling and the like. The machine may be further arranged for communication to a remote server via internet such as by WiFi or Ethernet.

Figure 8:
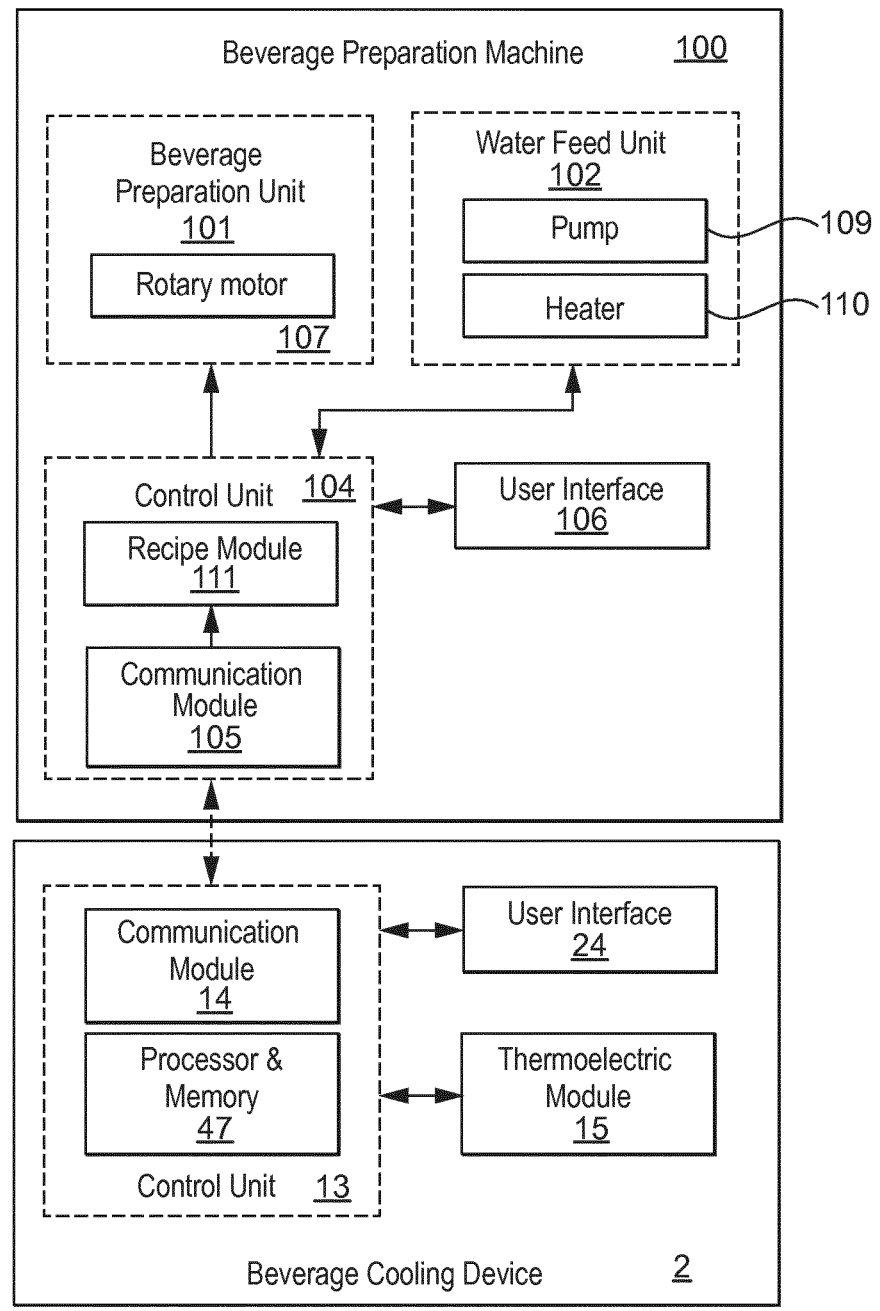
FIG. 8 is a block diagram illustrating an embodiment of the beverage preparation system of FIG. 1.

As illustrated on FIGS. 1 and 8, the beverage preparation machine 100 generally comprise a beverage preparation unit 101 arranged for receiving a capsule or pod, a water feed means 102 for feeding water to the beverage preparation unit 101 and a beverage outlet 103 for dispensing the beverage prepared in the preparation unit outside of the machine. The beverage can be collected in the cooling device 2 placed beneath the outlet for being cooled down. The machine further comprises a control unit 104 comprising a communication module 105 arranged for communicating with the cooling device. The machine may comprise a user interface 106 for displaying information and/or can be provided with control button(s).

The beverage preparation unit 101 can be of different kinds depending on the capsule or pod to be received. The beverage preparation unit is generally arranged to receive packed and/or non-packed beverage ingredients and to mix them with heated or non-heated water to provide the beverage. The mixture of beverage ingredients with water encompasses roast and ground coffee or leaf tea extraction, dissolution of soluble ingredients such as coffee, milk or tea, dilution of a beverage liquid, viscous or gel-type concentrate and combinations thereof. The beverage can be foamed or not in the beverage preparation unit. Such foaming may result from numerous shear stress generating means or else such as brewing pressure, beverage restriction valve, beverage flow rate, rotary device and combinations thereof.

In an example as further described in EP2000062B1 and WO2015173123A1, the beverage preparation unit comprises a centrifugal brewing unit arranged for receiving beverage capsules. The brewing unit is driven in rotation at high speed by a rotary motor 107 for generating centrifugal forces which conveys the beverage to the beverage outlet via a beverage collecting means. The beverage preparation unit can be other such as the one described in EP0512470 where a capsule is enclosed between a capsule cage arranged for the introduction of water in the capsule and a capsule support arranged for draining beverage to the beverage outlet. The type of beverage preparation unit is not limiting and it may be arranged for receiving pods such as filter pads as described in EP0904718 or WO2001015582A1. The beverage preparation unit can also be a chamber, for example with a porta-filter, for receiving non-packed beverage ingredients such as ground coffee as for example described in WO2013117362A1. The unit can also comprise a coffee reservoir associated to a coffee grinder and powder dosing means for dosing freshly ground powder in the brewing chamber such as described in WO2010064902A1.

Generally, the beverage preparation machine comprises a water feed unit comprising a refillable reservoir 108 for fresh water linked to a water pump 109 and a water heater 110 for heating water at temperature(s) controlled by the control unit before being fed to the beverage preparation unit 101.

As illustrated in FIGS. 1 to 5, the beverage cooling device 2 is designed for rapidly cooling down a beverage dispensed from the beverage preparation machine 100 to preferably a chilled temperature between 2-12 degrees, more preferably 4-8 degrees. The device generally comprises a heat exchange container 3 comprising a closed chamber 4 containing a phase-change coolant. The coolant is preferably liquid at ambient temperature and changes into solid when cooled down below zero degree Celsius. The coolant is preferably salted water. The chamber is closed in the sense that the coolant remains in the chamber at all time and no refrigeration circuit is contemplated. The coolant in the chamber accumulates energy when freezing and restores such energy essentially by the latent heat created by the fusion of the ice. In a preferred mode, the coolant comprises essentially water, most preferably, essentially salted water but could be another type of coolant.

The container 3 preferably comprises a beverage cavity 5 with an open end arranged for receiving the beverage. The cavity has preferably a beverage storage capacity enabling to store a beverage serving, e.g., 150 to 350 ml, preferably about 280 ml. The beverage cavity is preferably closed by a removable lid 7.

The chamber 4 and cavity 5 are separated by a heat conductive inner wall 8, preferably made of a metal having high heat conductivity and resistance to oxidation. The chamber has a cup-like shape as defined by the cup-like shape of the inner wall 8 and of outer wall 9. It is further closed by an outer wall 9 and an annular sealing ring 10 connecting the upper free end of the inner wall and outer wall. The sealing ring may be made of resilient polymer such as rubber or silicone.

Figure 3:
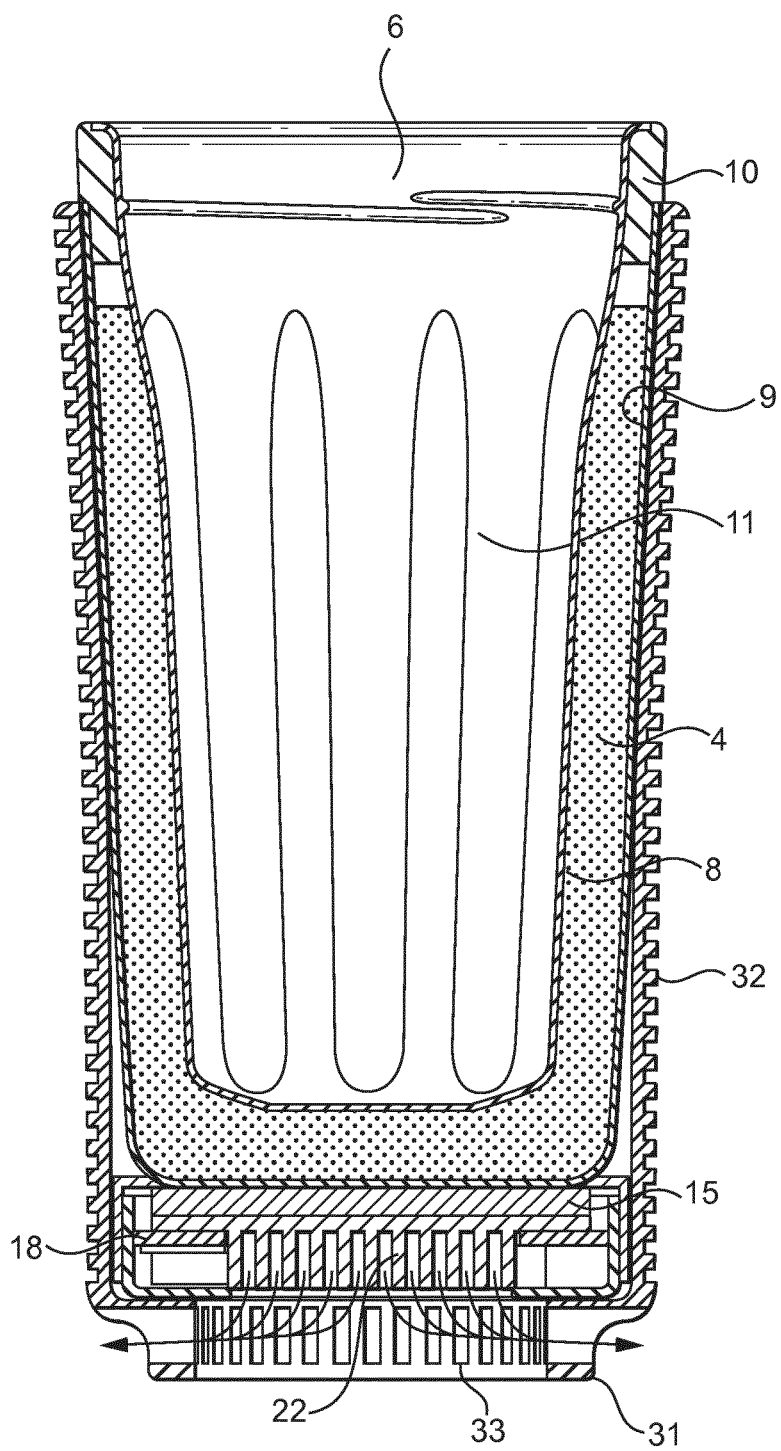
FIG. 3 shows a cross-sectional view of the beverage cooling device of FIG. 2.
Figure 4:
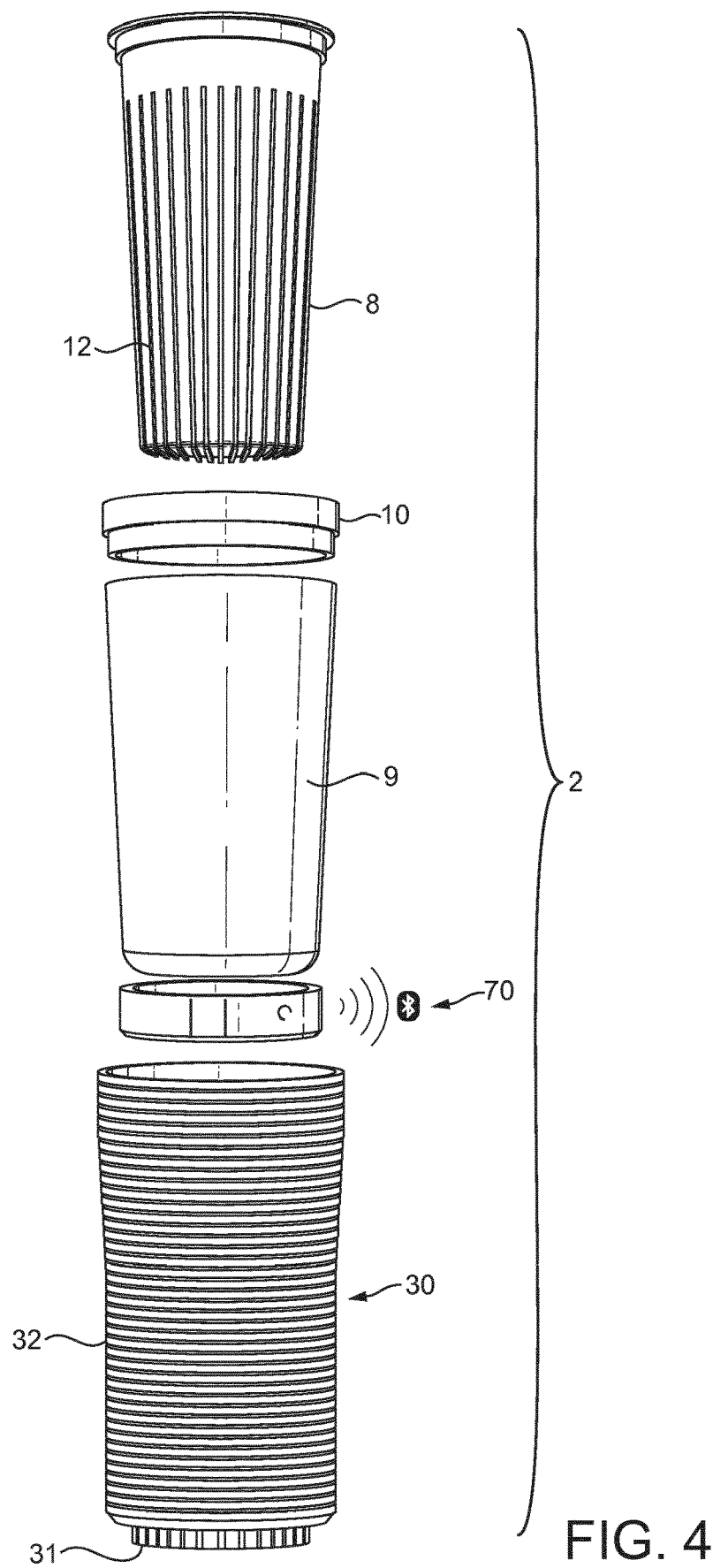
FIG. 4 shows a perspective exploded view of the beverage cooling device of FIG. 2.

As apparent in FIGS. 3 and 4, the surface of heat conductive inner wall which is interior to the cavity or in contact with the beverage preferably comprises a non-smooth arrangement for increasing the area in contact with the beverage and accelerating cooling. Preferably, the surface comprises a series of waves or undulations 11. In addition or alternatively, the opposite surface of the inner wall, on the side of the coolant's chamber, comprises a structure of multiple radial projections such as cooling fins 12. These projections project in the chamber containing the coolant. This design of cooling fins promote the heat transfer from the coolant in its ice state to the beverage thereby increasing the cooling efficiently.

According to a possible aspect of the invention, the beverage cooling device 2 comprises a control and energy management unit 70 which comprises a communication module 14. The communication module is arranged for communicating with the communication module 105 of the beverage preparation machine 100. The communication can be unidirectional to enable transfer of information from the cooling device to the machine or can be bi-directional to enable exchange of information between the cooling device and the machine. Preferably, the communication modules 14, 105 form a wireless communication network such as a low power radio field network such as Bluetooth. However, other communication networks can be envisaged including wired network such as with USB cabling. The communication module of the cooling device is preferably powered by a thermoelectric module 15. The thermoelectric module 15 is arranged in heat conductive contact with the container 3, more particularly, with the outer wall 9 so as to receive cooling energy and produce electrical energy therefrom. The communication module 14 can be set to start emitting communication signals when powered by the thermoelectric module 15 so as to identify its presence and a temperature status, e.g. cooling status, to the beverage preparation machine as soon as properly placed at the receiving communication distance range with the machine or in a predetermined position relative to the machine.

Figure 5:
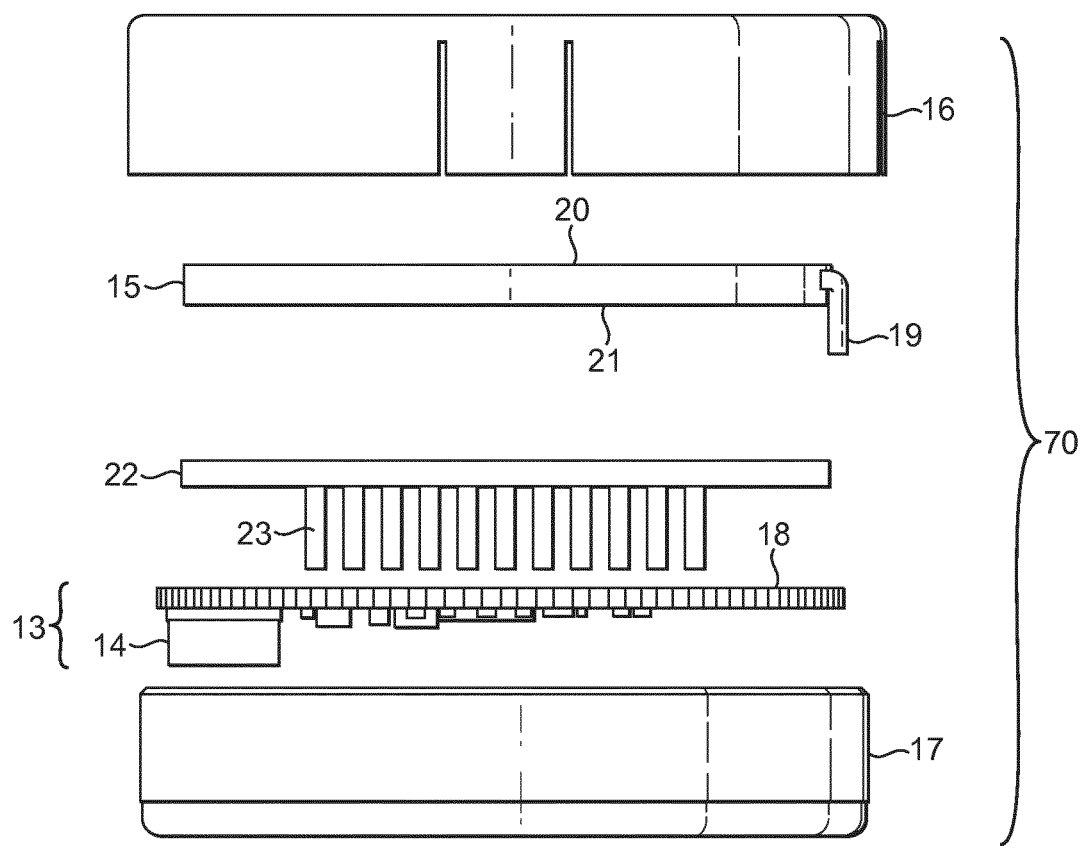
FIG. 5 shows a side view of a detail of the beverage cooling device of FIG. 2.

The control and energy management unit 70 is illustrated on FIG. 5 as a matter of example. The unit 70 is preferably positioned between the heat exchange container 3 and a heat insulating sheath 30 that covers the outer wall of the container except its open end. The heat insulating sheath is preferably removably arranged with the container such that the container can be handled separately for being cooled down in a freezer for instance or other freezing apparatus. Preferably, the heat insulating sheath 30 comprises a bottom 31 and a tubular sidewall 32 that cover the walls of the heat exchange container 3. However, the heat insulating sheath can be in two or more separate pieces which are not connected to each other. The heat insulating sheath is preferably essentially made of a heat insulating and resilient material such as foam polymer or silicone rubber. The resiliency of the material enables to insert the container in the heat insulating sheath by form fitting.

Figure 6:
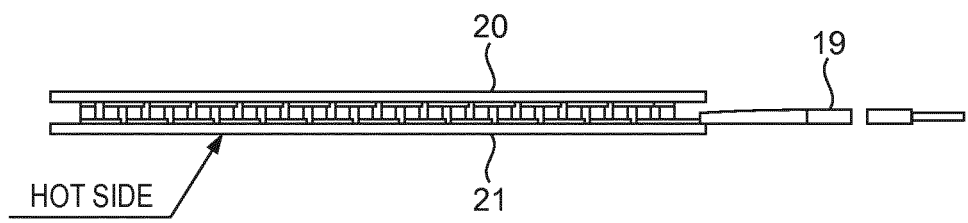
FIG. 6 shows a side view of a thermoelectric module for the beverage cooling device of the invention.
Figure 7:
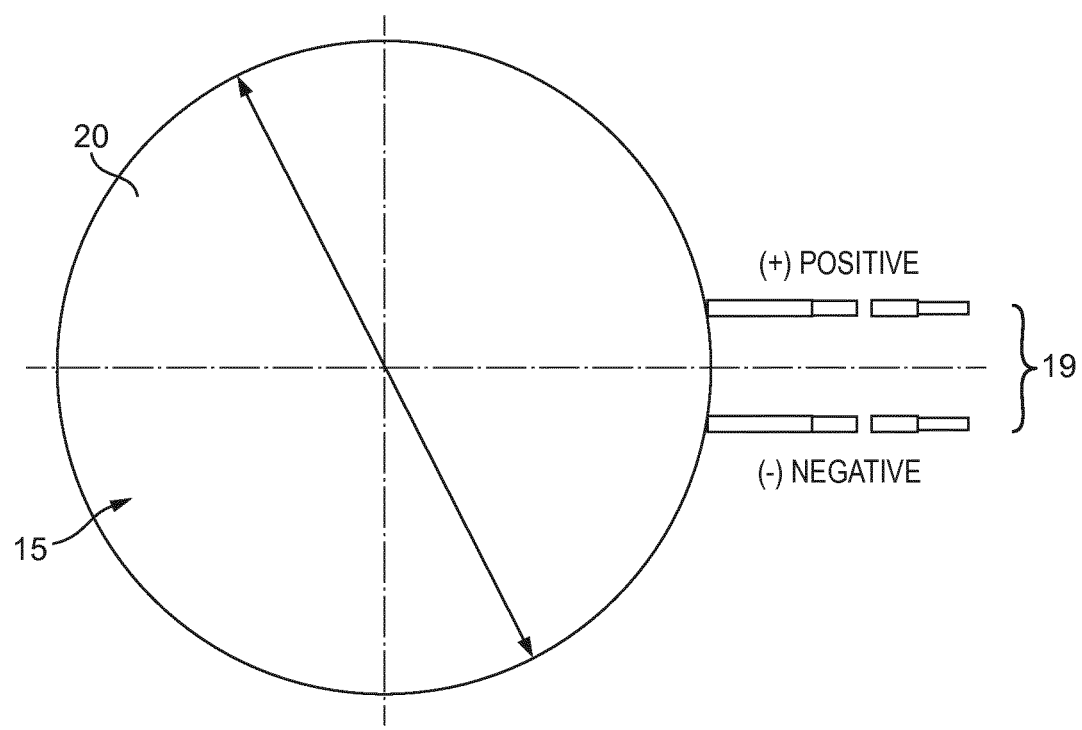
FIG. 7 shows a top view of the thermoelectric module of FIG. 6.

The control and energy management unit 70 may comprise a housing such as formed of two shelves 16, 17 for facilitating the assembling of the different elements. The communication module 14 can be part of a control unit 13 comprising an electronic control board 18 comprising a control circuit arranged for being powered by the thermoelectric module 15 via electrical connectors 19 of the module. The thermoelectric module is also represented on FIGS. 6 and 7. It is preferably a Peltier-type module comprising a first wall or cool wall 20 for contacting with the container and a second opposite wall or hot wall 21 and comprises a semi-conductor between the two walls. As a matter of example, the thermoelectric module can have the following characteristics (at 300K except $R_{ac}$): $I_{MAX}$=6.1 Amps, $U_{MAX}$=32 Volts, $\Delta T$=70° C., $Q_{MAX}$=120 Watts, $R_{ac}$=4.3 Ohm at 295K. The thermoelectric module is preferably associated with a heat sink element 22 which is positioned in heat conductive contact with the hot wall 21 of the module. The heat sink element can be arranged with a plurality of heat fins 23 that traverse the control board 18 to dissipate heat as shown on FIG. 3.

The bottom of the heat insulating sheath may comprise venting through-holes 33. This enables to exhaust heat coming from the control unit and from the heat sink element in particular. The control and energy management unit 70 can be placed in the heat insulating sheath as a possibly removably positioned part or a permanently fixed part.

FIGS. 1 and 8 illustrates a first possible mode of the beverage preparation system of the invention. The beverage cooling device can comprise a user interface 24 such as positioned on top of the lid 7 of the device. The user interface may indicate information to the user such as temperature-related information provided by the thermoelectric module or from temperature sensor(s) for instance. The control unit 13 can comprise a processor and data storage for storing data and/or instructions 46 such as dynamic random access memory (DRAM), static random access memory (SRAM) and/or other types of memory.

Temperature sensor(s) (not referenced) can be placed in contact with the container, for example, on a surface of the outer wall or of the inner wall to indicate to the control unit temperature of the coolant and/or beverage in the cavity of the device. The temperature sensors can be NTC sensors for example or other types of sensors. The temperature sensors can be powered by the thermoelectric module or by a separate battery (not shown). In case of a battery, the thermoelectric module could be omitted.

On the beverage preparation machine 100, the control unit 104 preferably comprises a communication module 105 and a recipe module 111 capable of preparing beverages in the machine by setting the different parameters of the machine according to a selection of beverages. The selection of the beverage can be made through the user interface 106 of the machine and/or through a capsule or pod recognition system. For enabling the functioning of the modules, the control unit 104 comprises a processor and data storage for storing data and/or instructions such as dynamic random access memory (DRAM), static random access memory (SRAM) and/or other types of memory.

For example, the preparing method and control unit arranged for carrying out the method can be such as the one described in WO2014090965 for preparing a beverage by centrifugation of a capsule in a beverage preparation machine. In a first step, recognition information related to a type of capsule is determined, in a second step, a recipe is selected according to the recognition information comprising at least two sets of target values for parameters of the centrifuging brewing device; each set being associated to a specific condition, and in third step, the control means control the parameters of the centrifuging brewing device so as to reach the target values of the set associated to the specific condition that is currently met. The sets of target values can relate to a complete cycle of preparation and/or brewing phases of the preparation in the machine. The target values for parameters of the beverage preparation unit or centrifuging brewing unit can be related to at least one or a combination of parameters: a volume of water to introduce in the capsule during preparation or specific phase(s) of the preparation process, a flow rate of water, a waiting time after a specific phase of the preparation process, an acceleration or deceleration function of the rotational speed of the brewing unit during a specific phase of the brewing or during transition between specific phases, a temperature of water during complete preparation or during a specific phase of the brewing process, a target temperature of the beverage outlet during complete preparation of during a specific phase, a minimal rotational speed of the brewing during complete preparation of during a specific phase of the brewing process and so on.

Figure 9:
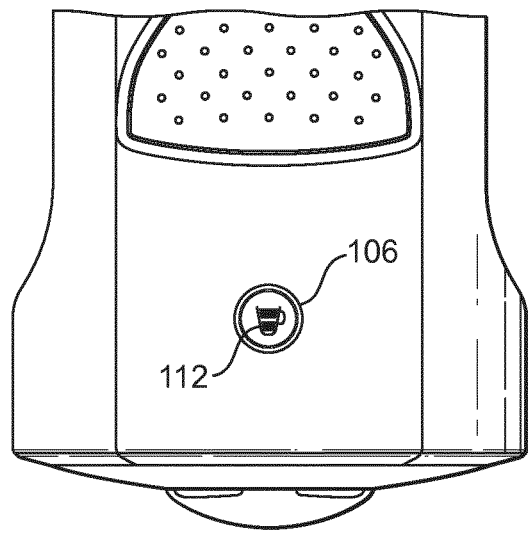
FIG. 9 shows a detail of the beverage preparation device of the system of FIG. 8.

In a possible mode of operation of the cooling module, the cooling module is first prepared for being capable of cooling a beverage dispensed from the beverage preparation machine. For this, the container is separated from the heat insulating sheath for storage in a freezer, such as a kitchen freezer, until the coolant is changed into ice or a combination of ice and liquid. When a cool beverage is desired, the container when frozen is removed from the freezer and inserted in the heat insulating sheath 30. It should be noted that the complete device can also be stored in the freezer. Once the container is in heat exchange contact with the control unit, particularly with the thermoelectric module 15, electrical energy is provided by the module 15 which is received by the control board and transmitted to the communication module 14 and optionally the user interface 24. As the communication module 14 becomes powered, it can emit signal(s) that the cooling device is in a potentially cooling mode. When the cooling module is placed next to the beverage preparation device, for example beneath the beverage outlet, the communication is established with the communication module 105 of the machine. In response to the received communication signal(s), the control unit 104 of the machine sets the suitable parameters of preparation of the beverage preparation machine, such as by the recipe module 111. The recipe module can be arranged as one or more programs and a memory containing a set of different beverage recipes, such as hot beverage recipes and cold beverage recipes. For example, beverage recipes contain water temperature-related parameters for controlling the heater of the machine. The water temperature-related parameters can be different depending on whether it relates to hot or cold beverages. In particular, for hot beverage recipes, the heater 110 can be set to deliver the hot water to the beverage preparation unit at a temperature above 75° C., for example, between 80 and 95° C. and, for cold recipes, at a temperature below 70° C., for example between 35 and 50° C., for example 40+/−5° C. The beverage recipe may comprise additional parameters relevant to the preparation of the beverages, some being specific to cold beverages, such as for example the value or range of rotational speed(s) of the rotary motor 107 driving the centrifugal beverage preparation unit 101 and/or the volume of the water delivered through the pump 109 and to the capsule or pod in the preparation unit. Therefore, when the presence of the cooling module 2 is detected by the machine, the suitable beverage recipe is selected and the beverage preparation can be initiated automatically or upon a user's validating action on the machine, e.g. upon pressing a start button at the user's interface 106. For example, on FIG. 9, the user interface of the machine can display a cold beverage pictogram 112 that identifies the selection of the cold beverage recipe. The pictogram can be associated to the start button so that the preparation can be started by the user as a soon as such pictogram is lightened.

Figure 10:
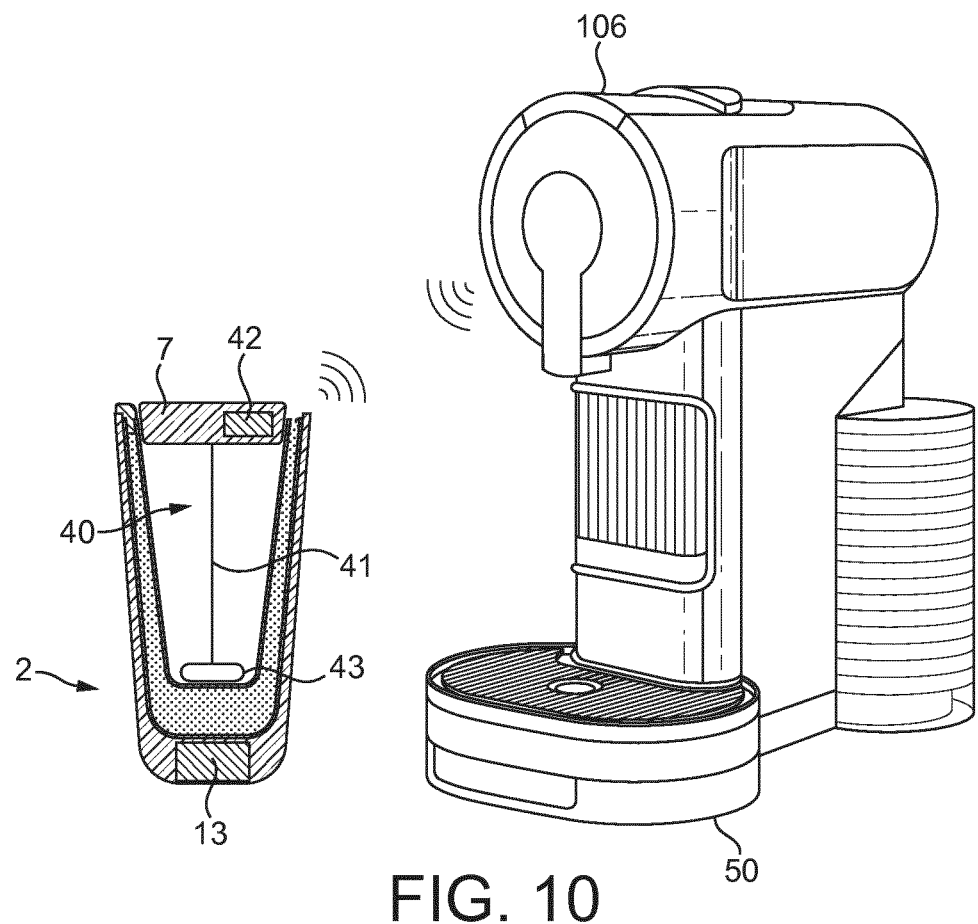
FIG. 10 shows to a beverage preparation system according to a second mode of the invention.
Figure 11:
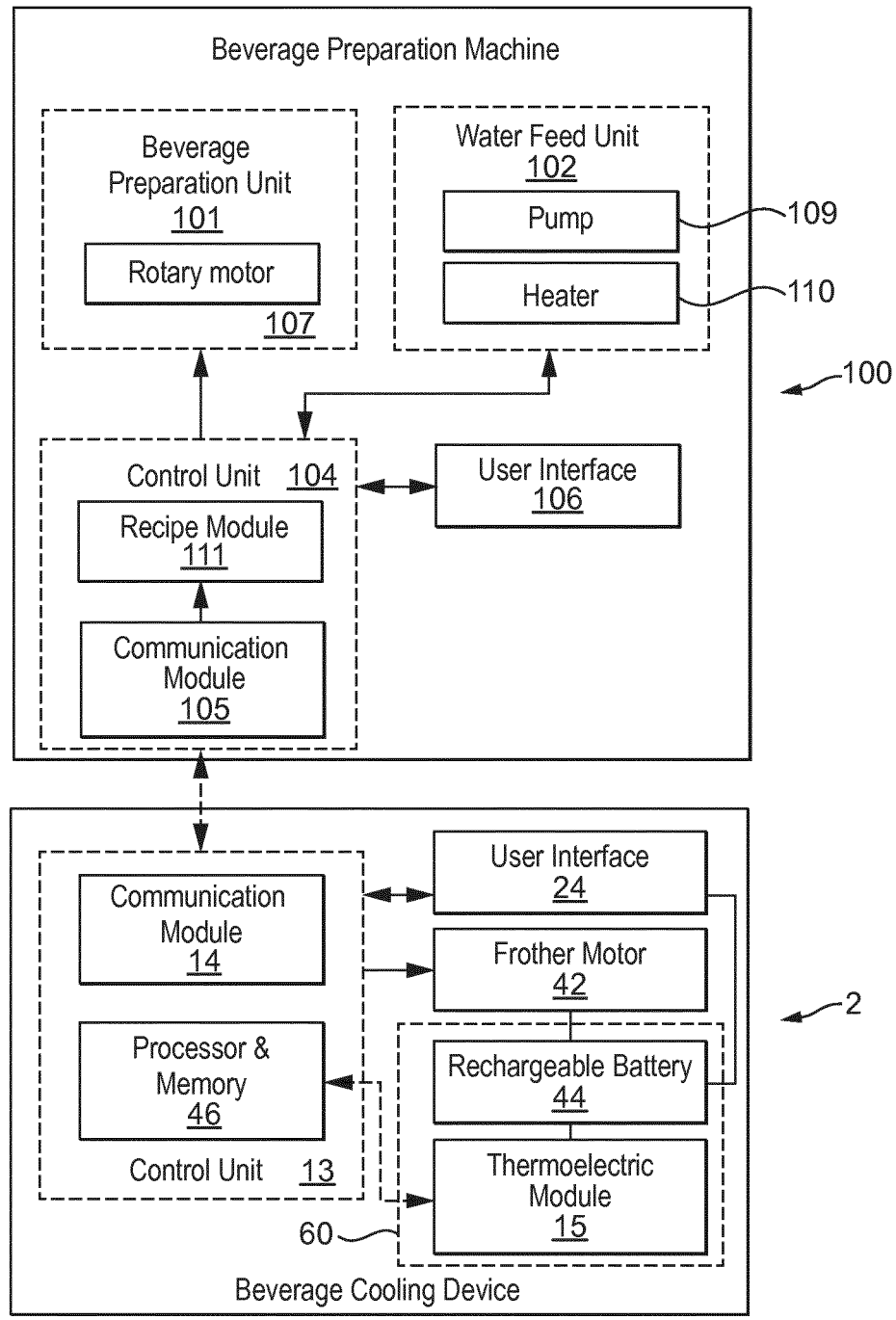
FIG. 11 is a block diagram illustrating an embodiment of the beverage preparation system of FIG. 10.

A possible second mode of the system of the invention is illustrated on FIGS. 10 and 11. The difference with the previous mode lies in the additional functionality of frothing or mixing the beverage in the container by a dedicated beverage frothing assembly 40 and an energy management unit 60 including a battery. The advantage can be that frothing or mixing can be controllably operated by the beverage cooling module 2 and/or beverage preparation machine 100. In particular, frothing can be controlled by the machine 100 via the communication modules 105, 14. The machine can take control of the device on a master-slave basis so that frothing may be coordinated with the dispensing time of at least one component of the beverage. For example, for preparing an iced cappuccino, frothing may be started such as for frothing liquid milk in the cooling device before dispensing of the coffee extract from the capsule and can be stopped as the coffee extract is dispensed in the cooling device. In an alternative, frothing can remain controlled by the cooling device only.

The frothing assembly 40 can be part of the lid. It may comprise a rotary frothing member 41 extending in the cavity of the device with a shaft rotary connected at its drive end to a motor 42 placed in the lid 7 and at its free end to an impeller of whisk 43.

The frothing assembly 40 may be powered by at least one battery 44 of an energy management unit 60 which may be housed in the lid or in the bottom of the device. The battery 44 may be rechargeable. It can be arranged for being recharged by an external electrical source, e.g., via a suitable connector, power converter and cord, e.g., USB charging assembly, and/or be arranged for being charged at least partially be the thermoelectric module 15.

In an alternative, the control unit 13 of the cooling device can be placed with the communication module 14 in the lid to reduce the distance of communication between the modules. The thermoelectric module 15 remains in the bottom and can be connected to the communication module via specific connectors 19.

Figure 12:
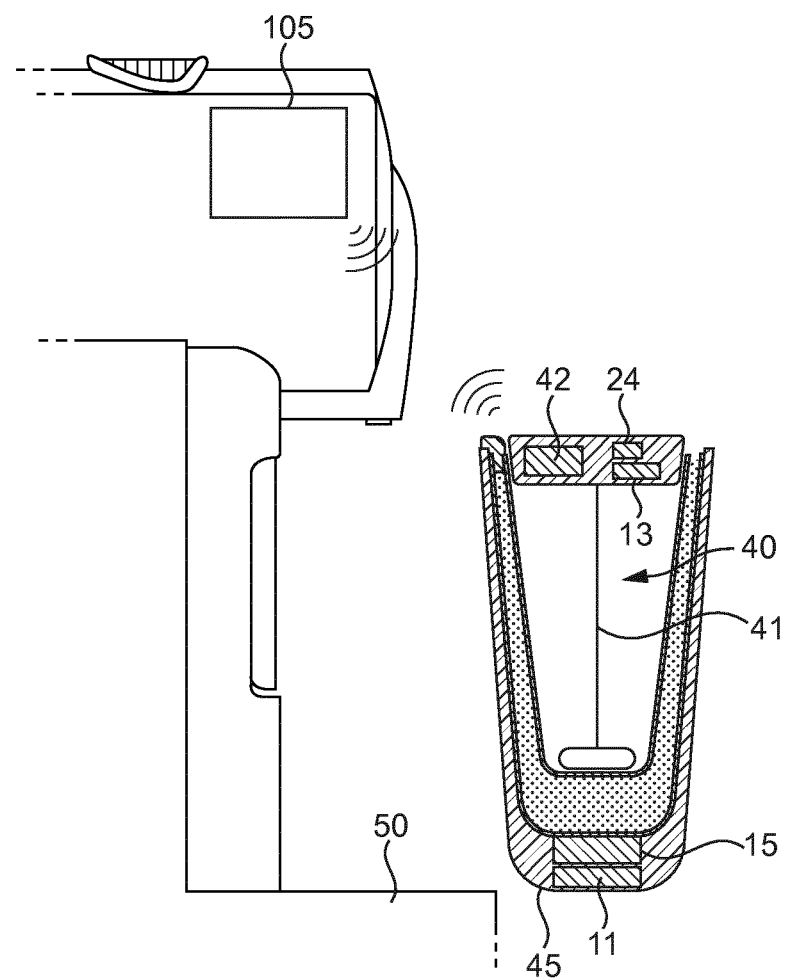
FIG. 12 shows to a beverage preparation system according to a third mode of the invention.
Figure 13:
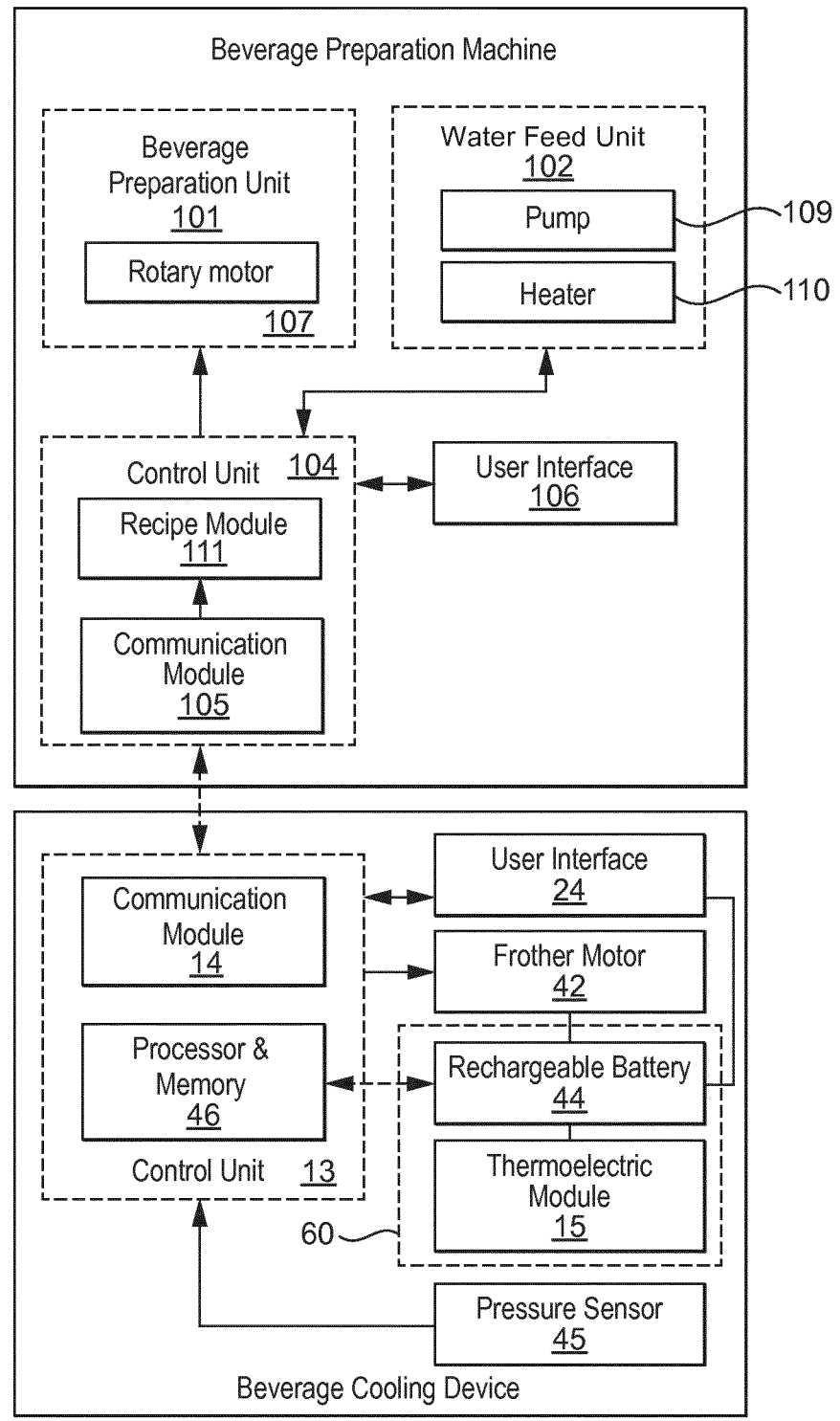
FIG. 13 is a block diagram illustrating an embodiment of the beverage preparation system of FIG. 12.

A third possible mode of the invention is illustrated on FIGS. 12 and 13. The difference with the previous mode lies in the additional functionality of measurement of the beverage volume present in the cooling device. For this, the cooling device may comprise a pressure sensor 45 placed in the bottom of the device, preferably in or under the bottom of the heat insulating sheath. The pressure sensor provides pressure input to the control unit 13.

In an alternative, the control unit 13 can be physically placed with the communication module in the lid to save room in the bottom for the pressure sensor and/or reduce distance of communication between the modules. The thermoelectric module 15 of the unit can physically remain in the bottom and be connected to the other parts of the control unit, e.g., communication module 14, in the lid such as via appropriate wireless connectors between the container and lid.

In an alternative, the pressure sensor 45 can be positioned on the support 50 of the beverage preparation machine.

Figure 14:
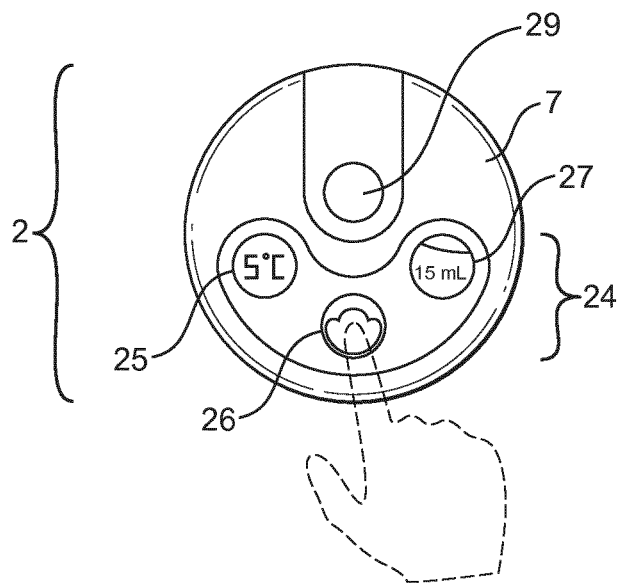
FIG. 14 shows a top view of an example of the user interface of the cooling device according.

FIG. 14 illustrates a status of the user interface 24 of the beverage cooling module 2. For example, the user interface may comprise different pictograms as part of selectable or non-selectable displays. A first pictogram 25 may indicate the heat transfer temperature of the device. This temperature can be taken from the thermoelectric module or by temperature sensor(s) as discussed earlier. A second pictogram 26 may display a selectable liquid frothing function. This pictogram may be associated to a selectable button when this pictogram is displayed, e.g., lightened. When the button is pressed, the frothing functionality can be selected. The selection may remain local in the cooling device in which case the frothing assembly starts running. Alternatively, the selection can be delocalized to the beverage preparation machine via the communication network; the machine thereby becoming the master over the cooling device, for being activated in a more global and coordinated manner with the preparation of the beverage by the machine and device. The third pictogram 27 may relate to a volume indication of the beverage contained in the cavity of the cooling device and is obtained by the pressure sensor. The volume may be expressed in different possible ways such as in volume values, e.g. in milliliters, or by visual pictogram (s).

Figure 15:
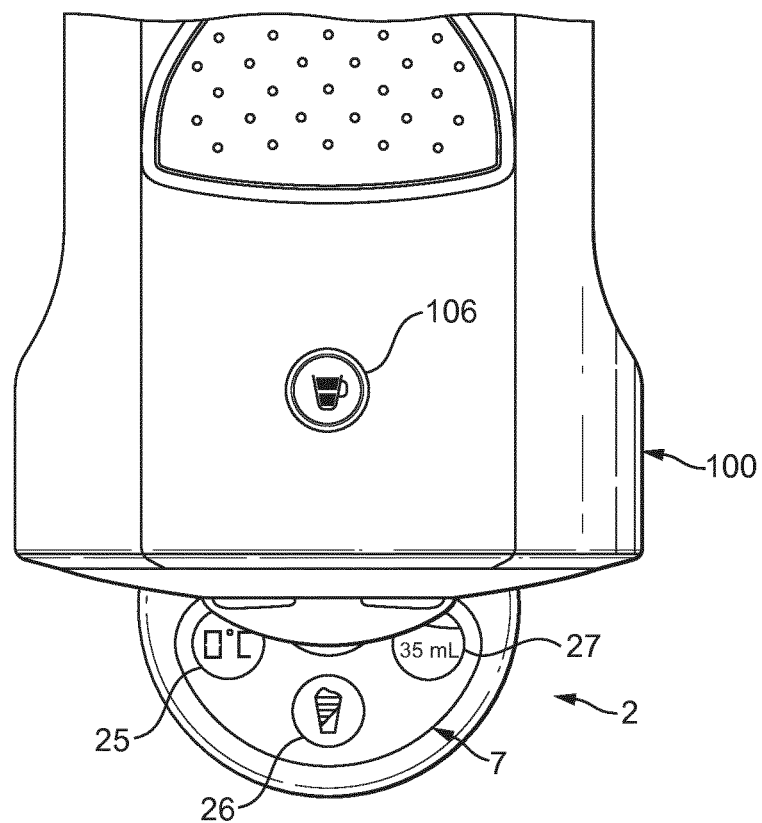
FIG. 15 shows a top view of an example of the user interfaces beverage preparation machine and cooling device.

FIG. 15 illustrates a status of the user interface 24 of the beverage cooling module 2 and a status of the user interface 106 of the beverage preparation machine 100. When the cooling device is associated to the beverage preparation machine by the communication network, the user interface of the beverage preparation machine can display a recipe pictogram 106. This pictogram can be associated to a selectable button that may be pressed for selecting the recipe in the machine, such as a cold beverage recipe. This pictogram may alternatively be automatically selected by the cooling device being recognized by the beverage preparation machine. The recipe pictogram 26 of the cooling device can display accordingly. It may schematically represent the selected beverage in its final appearance. The third pictogram 27 may represent the volume of the beverage as measured by the pressure sensor 45 as beverage is dispensed in the device by the machine.

As illustrated in FIG. 14, the lid can comprise a dispensing aperture 29 communicating with the cavity for enabling the beverage to be dispensed inside the cavity while the mixing or frothing operation is carried on. Mixing, generally run at rotational speed lower than frothing, promotes the rapid cooling of the beverage dispensed in the device. The aperture 29 can be selectively closed such as by plug or hinged cover. The aperture can also conveniently be used for inserting a drink straw.

Figure 16:
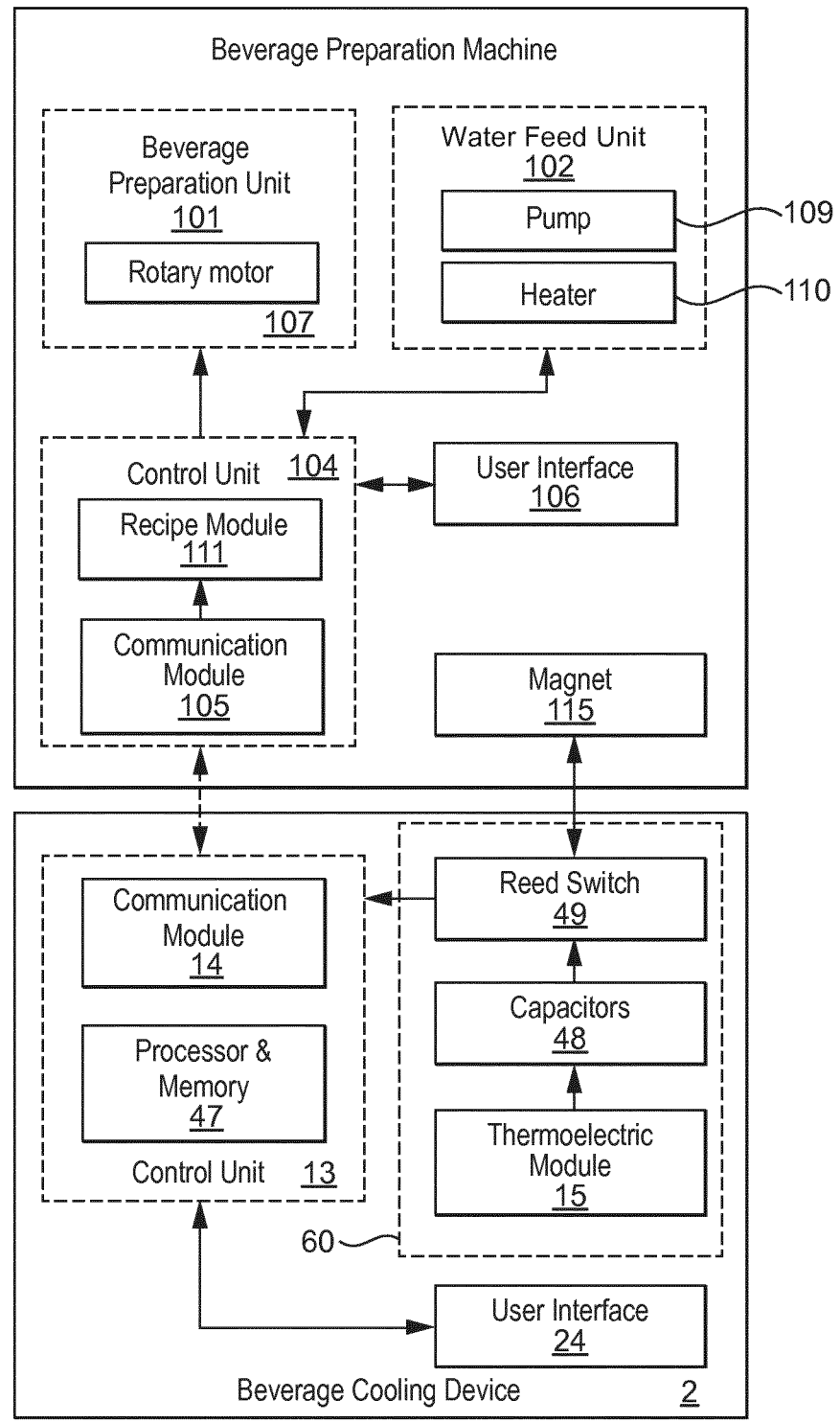
FIG. 16 is a block diagram illustrating another embodiment of the beverage preparation system.
Figure 18:
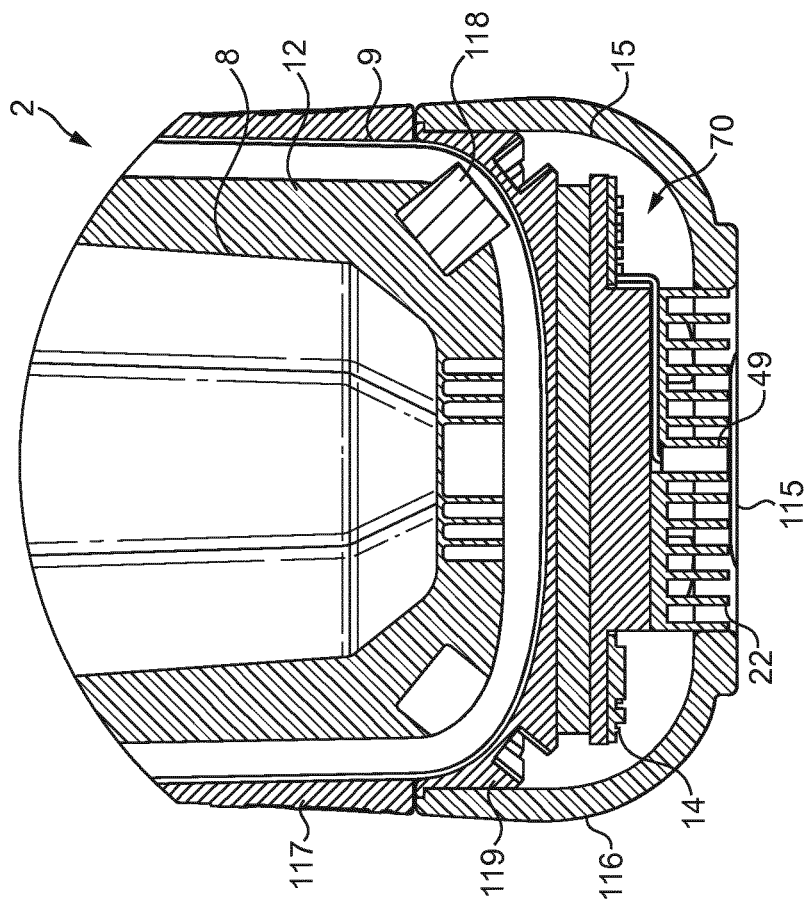
FIG. 18 shows a cross-sectional view of a detail of the beverage cooling device of FIG. 17 when on contact with a surface of the beverage preparation machine.
Figure 17:
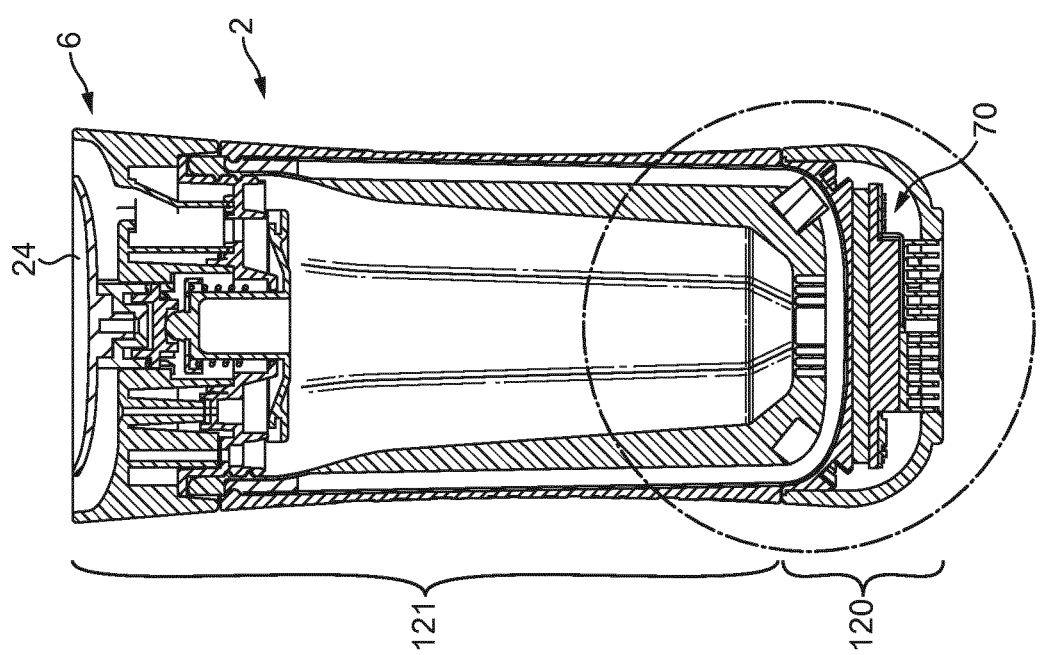
FIG. 17 shows a cross-sectional view of the beverage cooling device of according to the block diagram of FIG. 16.

FIGS. 16 to 18 illustrate a possible variant. In this variant, the electrical energy management unit 60 is arranged to selectively power the control unit 13 as a response to a mechanical, electrical, magnetic or combined interaction between the cooling device next to the beverage preparation machine. In particular, the system comprises an electrical energy management unit 60 comprising an energy accumulator such as at least one capacitor or ultra-capacitor 48 for accumulating energy from the thermoelectric module. The capacitor or ultra-capacitor can be placed in series with the thermoelectric module so as to be charged as soon as an electrical potential is generated in the module. The electrical energy management unit 60 further comprises an accumulator control member, such as a power interrupter 49 which is arranged to maintain the energy accumulator charged when the cooling device is away from the beverage preparation machine and to deliver the electrical power upon a selective interaction of the accumulator control means with an actuation interrupter member 115, of the beverage preparation machine.

In a preferred construction, the accumulator control member of the energy management unit can be a Reed switch and the actuation interrupter member can be a magnet or magnets. The Reed switch is open in absence of magnetic field created by the magnet(s). The magnet(s) can be placed on the drip tray of the machine supporting the cooling device or behind the front panel or in the beverage outlet, for instance, depending on the location of the Reed switch in the cooling device. When the Reed switch is placed in the field of the magnet(s) by approaching the cooling device from the beverage preparation member, the switch closes the electrical line between the energy management unit and the control unit thereby allowing the capacitor from discharging power to the control unit 13, in particular, to the communication module 14. As the communication module is powered, communication is simultaneously established between the cooling device and the beverage preparation machine.

In FIG. 18, the actuation interrupter member is a magnetic sheet 115 which contacts the underside of the cooling device when the device rests on a tray of the beverage preparation machine. The Reed sensor 49 may be positioned in a cavity of the heat sink element 22. The accumulator control member and the actuation member can also be a mechanical switch assembly such as a retractable spring biased switch or any electrical or electromagnetic equivalent means. Other energy accumulators can be used such as a rechargeable battery.

The cooling device 2 in FIGS. 17 and 18 comprises a two-part heat insulating sheath 30 with a a lower part 116 covering the control and energy management unit 70 and an upper part 117 covering the sidewall of the heat exchange container 3. The lower part 116 and control and energy management unit 70 form together a lower control sub-assembly 120 that is removably attached to the upper part 117 and heat exchange container forming an upper cooling sub-assembly 121. The removable connection between the upper and lower sub-assemblies may be magnetic or a form-fitting arrangement. In the illustrated (non-limiting) example, a series of magnets 118 positioned in the bottom of the container forms a reversible magnetic connection with a heat conducting and ferromagnetic element 119 associated to the thermoelectric module 15. An advantage of this variant lies in that it becomes easier and more convenient to separate the control subassembly 120 from the upper cooling subassembly 121 with the heat exchange container 3. The space occupied by the separated control means becomes smaller and easier to store. The lower control sub-assembly 120 can be associated to a particular user more easily and so several sub-assemblies 120 can be used with a single upper cooling sub-assembly 121. A memory of the control unit 13 of lower control sub-assembly 120 may store beverage preferences such as particular recipes under the form of executable programs and/or parameter settings.

The invention can encompass many other variants which fall in the scope of the appended claims.

The invention claimed is:

1. A beverage cooling device for rapidly cooling a beverage and serving the beverage when cooled, after having been dispensed from a beverage preparation machine in the device, the beverage cooling device comprising:
   a heat exchange container comprising a closed chamber containing a phase-change coolant capable of accumulating and restoring thermal energy and a beverage cavity with an open upper end for receiving the beverage, the closed chamber and cavity being separated by at least one heat conductive inner wall, and the chamber being further closed by an outer wall;
   a control unit comprising a communication module arranged for communicating to the beverage preparation machine information representative of the presence of the device at proximity of the beverage preparation machine and/or of a temperature state of the coolant in the chamber;
   a lid removably arranged for liquid-tightly closing the open upper end of the heat exchange container, a user interface being arranged on the lid;
   a liquid frothing assembly in the lid or in the bottom of the heat exchange container;
   an electrical energy management unit comprising a thermoelectric module arranged in thermal contact with the outer wall of the chamber for generating electric energy to the control unit, as a function of the temperature difference between a first heat conductive wall of the module in contact with the outer wall of the chamber and a second heat conductive wall of the module distant to the first wall, the electrical energy being at least partially used to power the communication module to generate communication signal; and
   a heat insulation sheath covering at least partially the outer wall of the heat exchange container,
   wherein the beverage cooling device is arranged to be handled separately from the beverage preparation machine.

2. The beverage cooling device according to claim 1, wherein the communication module is a wireless communication module.

3. The beverage cooling device according to claim 1, wherein the electrical energy management unit comprises at least one electrical energy accumulator.

4. The beverage cooling device according to claim 1, wherein a heat sink element is connected to the second face of the thermoelectric module.

5. The beverage cooling device according to claim 1, comprising:
   at least one temperature sensor arranged for sensing the temperature of surface of the container and
   a battery for powering the communication module.

6. The beverage cooling device according to claim 1, comprising a user interface arranged for displaying a characteristic selected from the group consisting of: a temperature information related to the thermoelectric module or temperature sensor, a beverage volume, a selectable recipe of the beverage preparation device, and identification data.

7. The beverage cooling device according to claim 1, wherein the heat insulation sheath is free of permanent connection means with the container to be removably arranged with the container such that it can be removed before being frozen.

8. The beverage cooling device according to claim 1, comprising a control and energy management unit, comprising the control unit and the electrical energy management unit, which is positioned in the bottom of the sheath or alternatively on the bottom of the sheath and between the sheath and the container.

9. The beverage cooling device according to claim 8, comprising a lower control sub-assembly and an upper cooling subassembly which are removably connected to each other; the lower control sub-assembly comprising the control and energy management unit and a lower part of the heat insulation sheath and the upper cooling subassembly comprising the heat exchange container and an upper part of the heat insulation sheath.

10. A beverage preparation system comprising a beverage cooling device for rapidly cooling a beverage and serving the beverage when cooled, after having been dispensed from a beverage preparation machine in the device, comprising a heat exchange container comprising a closed chamber containing a phase-change coolant capable of accumulating and restoring thermal energy and a beverage cavity with an open upper end for receiving the beverage; the closed chamber and cavity being separated by at least one heat conductive inner wall; the chamber being further closed by an outer wall; wherein the device is arranged to be handled separately from the beverage preparation machine, and the device comprises a control unit comprising a communication module arranged for communicating to the beverage preparation machine information representative of the presence of the device at proximity of the beverage preparation machine and/or of a temperature state of the coolant in the chamber and a beverage preparation machine, wherein the beverage preparation machine comprises:

a beverage preparation unit arranged for receiving a beverage capsule or pod containing beverage ingredients;

a water feed unit for supplying heated water in the beverage capsule for mixing with the beverage ingredients contained therein;

a beverage outlet arranged in liquid communication with the beverage preparation unit for dispensing the beverage in the cooling device;

a control unit for controlling the water feed unit and, the control unit is arranged for adjusting at least one preparation parameter of the water feed unit or beverage preparation unit as a result of the signal(s) received by or exchanged with the communication module of the beverage cooling device.

\* \* \* \* \*